United States Patent
McMahan et al.

(10) Patent No.: US 11,938,829 B2
(45) Date of Patent: Mar. 26, 2024

(54) THIRD RAIL PADDLE SYSTEM

(71) Applicant: TransTech of South Carolina, Inc., Greenville, SC (US)

(72) Inventors: Travis McMahan, Honea Path, SC (US); Ryan Miller, Greenville, SC (US); Steven J. Knox, II, Greenville, SC (US)

(73) Assignee: TRANSTECH OF SOUTH CAROLINA, INC., Greenville, SC (US)

( * ) Notice: Subject to any disclaimer, the term of this patent is extended or adjusted under 35 U.S.C. 154(b) by 133 days.

(21) Appl. No.: 17/506,916

(22) Filed: Oct. 21, 2021

(65) Prior Publication Data

US 2022/0371447 A1    Nov. 24, 2022

Related U.S. Application Data

(60) Provisional application No. 63/190,998, filed on May 20, 2021.

(51) Int. Cl.
  *B60L 5/02*    (2006.01)
  *B60L 5/39*    (2006.01)

(52) U.S. Cl.
  CPC .. *B60L 5/02* (2013.01); *B60L 5/39* (2013.01)

(58) Field of Classification Search
  CPC ...... B60L 5/02; B60L 5/39; B60L 5/38; B60L 5/08
  See application file for complete search history.

(56) References Cited

U.S. PATENT DOCUMENTS 3,740,498 A * 6/1973 Herbert .................... B60L 5/38
                                                   191/49
4,464,546 A * 8/1984 Culver ..................... B60L 5/08
                                                   191/49

(Continued)

FOREIGN PATENT DOCUMENTS

CN    205130955 U    4/2016
CN    111409464 A    7/2020

(Continued)

OTHER PUBLICATIONS

Extended European Search Report dated Oct. 17, 2022 for corresponding EP Patent Application No. 22172943.7 (9 pages).

(Continued)

*Primary Examiner* — Robert J McCarry, Jr.
(74) *Attorney, Agent, or Firm* — The Small Patent Law Group LLC; Christopher R. Carroll

(57) ABSTRACT

A third rail paddle system includes a support assembly configured for attachment to a vehicle, a pivot connection attached to the support assembly and that defines a range of up and down movement, and a third rail paddle assembly having an arm unit and a paddle. The paddle assembly is attached to the pivot connection for the paddle to contact a third rail and move up and down relative to the third rail when the support assembly is attached to the vehicle. One of the pivot connection, the paddle assembly, or the support assembly includes a stop element that limits the range of the up and down movement and prevents the paddle assembly from moving downwards to a bottom of the range of movement.

17 Claims, 5 Drawing Sheets

(56) References Cited

U.S. PATENT DOCUMENTS

| | | | |
|---|---|---|---|
| 2011/0139561 A1 | | 6/2011 | Sommer |
| 2013/0081915 A1 * | | 4/2013 | Sommer .................. B60L 5/38 |
| | | | 191/49 |
| 2014/0345398 A1 * | | 11/2014 | Robertson ................ B60L 5/28 |
| | | | 74/25 |

FOREIGN PATENT DOCUMENTS

| | | | | |
|---|---|---|---|---|
| CN | 111572354 A1 | | 8/2020 | |
| CN | 110667392 B | | 12/2020 | |
| DE | 102013207824 A1 * | | 10/2014 | ............... B60L 5/39 |
| EP | 3305578 A1 | | 4/2018 | |
| GB | 150108 A | * | 9/1920 | |
| GB | 2428657 A | * | 2/2007 | ............... B60L 5/02 |
| JP | S50117505 U | | 9/1975 | |
| JP | H01194802 A | | 4/1989 | |
| JP | 2019135894 A | | 8/2019 | |

OTHER PUBLICATIONS

Office Action dated Sep. 21, 2023 for corresponding Japanese Patent Application No. 2022-044285 (12 pages).

\* cited by examiner

THIRD RAIL PADDLE SYSTEM

CROSS-REFERENCE TO RELATED APPLICATIONS

This application claims priority to U.S. Provisional Application No. 63/190,998 (filed 20 May 2021), the entire disclosure of which is incorporated herein by reference.

BACKGROUND

Technical Field

Embodiments of the subject matter described herein relate to vehicles that receive power from or otherwise interact with third rails.

Discussion of Art

Third rails (also known as electric rails or conductor rails) are used in some transportation systems to provide electrical power to vehicles that run on electricity. The third rail extends along a demarcated or known vehicle route (e.g., along a set of rail tracks), and is spaced relative to the route by a set distance. The third rail includes a metal or other conductive surface along its length, to which a voltage is applied from a public utility or other offboard source. Vehicles designated to receive power from the third rail are outfitted with current collectors, which are devices positioned on the vehicles to come into electrical contact with and slide or track along the third rail as the vehicle travels along the route, for transferring power from the third rail to the vehicle.

Third rails may be located outdoors and thereby subject to weather conditions such as ice or snow. As such, some vehicles are provided with third rail ice scrapers, which may mechanically mimic the general functionality of a current collector, in terms of tracking along the third rail, but which are electrically insulated and do not transfer power to the vehicle. Instead, the ice scrapers are configured, e.g., with scraper blades, to remove ice from the third rail as the vehicle travels along the route. This improves the degree of electrical contact between the third rail and vehicle current collectors that subsequently track along the third rail for power transfer.

In a given transportation network, the spacing between a third rail and its associated route may vary, both vertically and laterally, along the length of the route. For example, the third rail and/or the route may undulate (due to wear, temperature contraction, route surface erosion or settling, etc.), resulting in uneven vertical distances between the route surface and the third rail along the route. Also, different sections or blocks of the route may have third rails with different lateral spacing, or the lateral spacing may vary due to maintenance issues such as bent supports. Both current collectors and ice scrapers are meant to function by traveling over the top surface of the third rail. However, significant vertical variances in spacing may result in a collector or ice scraper failing to track properly, and lateral variances may result in a collector or ice scraper impacting the third rail and being damaged or breaking away from the vehicle entirely.

Therefore, it may be desirable to provide a vehicle third rail interface device or system (e.g., current collector or ice scraper) that differs from existing systems.

BRIEF DESCRIPTION

In one or more embodiments, a system (e.g., third rail paddle system) includes a support assembly that may attach to a vehicle, a pivot connection attached to the support assembly and that defines a range of up and down movement, and a third rail paddle assembly having an arm unit and a paddle. The paddle assembly is attached to the pivot connection for the paddle to contact a third rail and move up and down relative to the third rail when the support assembly is attached to the vehicle. One of the pivot connection, the paddle assembly, or the support assembly includes a stop element that limits the range of the up and down movement and prevents the paddle assembly from moving downwards to a bottom of the range of movement.

In another embodiment, a system includes a support assembly configured for attachment to a vehicle, a pivot connection attached to the support assembly, and a third rail paddle assembly having an arm unit and a paddle attached to a first end of the arm unit. A second end of the arm unit is attached to the pivot connection for the paddle assembly to pivot relative to the support assembly and the paddle to contact a third rail and move up and down relative to the third rail when the support assembly is attached to the vehicle. The paddle assembly includes a shear element configured to shear upon application of a determined force to a side of the paddle for either the paddle to detach from the arm unit or the arm unit (and thereby the entire paddle assembly) to detach from the pivot connection.

In another embodiment, a system includes a support assembly configured for attachment to a vehicle, a pivot connection attached to the support assembly, and a third rail paddle assembly having an arm unit and a paddle. The paddle assembly is attached to the pivot connection. The pivot connection includes a vertical pivot assembly and a lateral pivot assembly for the paddle assembly to pivot relative to the support assembly both laterally and vertically. The lateral pivot assembly includes an elastic element that biases the lateral pivot assembly and paddle assembly towards a center of a range of lateral pivoting of the paddle assembly.

In another embodiment, a system includes a support assembly configured for attachment to a vehicle, a pivot connection attached to the support assembly, and a third rail paddle assembly attached to the pivot connection for the paddle assembly to pivot vertically relative to the support assembly. The paddle assembly includes an arm attached to the pivot connection, a lateral pivot joint attached to the arm, and a paddle attached to the lateral pivot joint. The paddle is configured to move laterally relative to the arm about the lateral pivot joint. The pivot joint includes an elastic element that biases the paddle to a center of a range of lateral movement of the paddle about the pivot joint.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to third rail paddle systems. These paddle systems refer to devices or assemblies attachable to a vehicle for running a paddle along a third rail for a designated function. For example, the paddle may be a current collector or a scraper.

Figure 1:
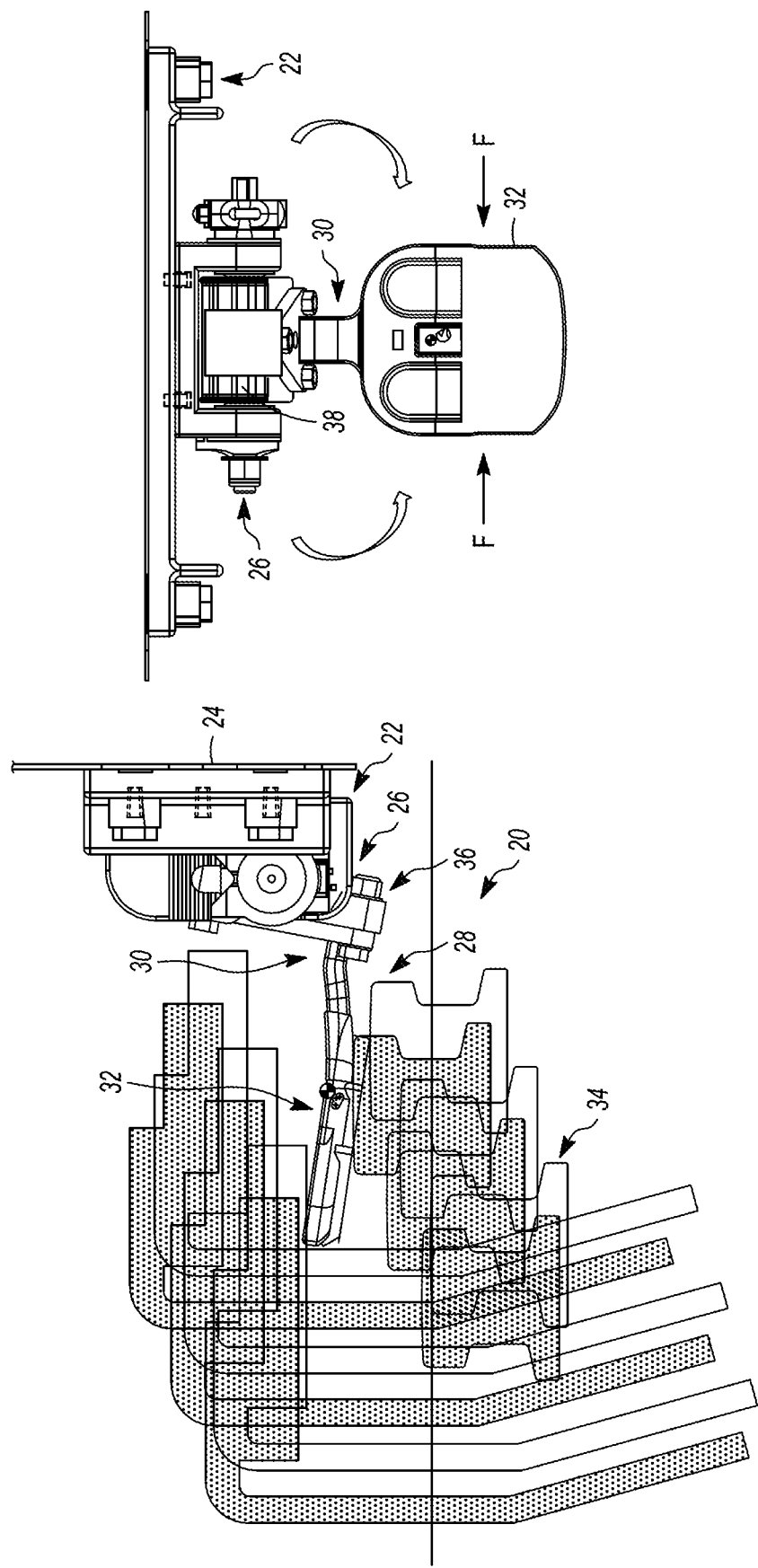
FIG. 1 is a schematic view of a first embodiment of a third rail paddle system.
Figure 2:
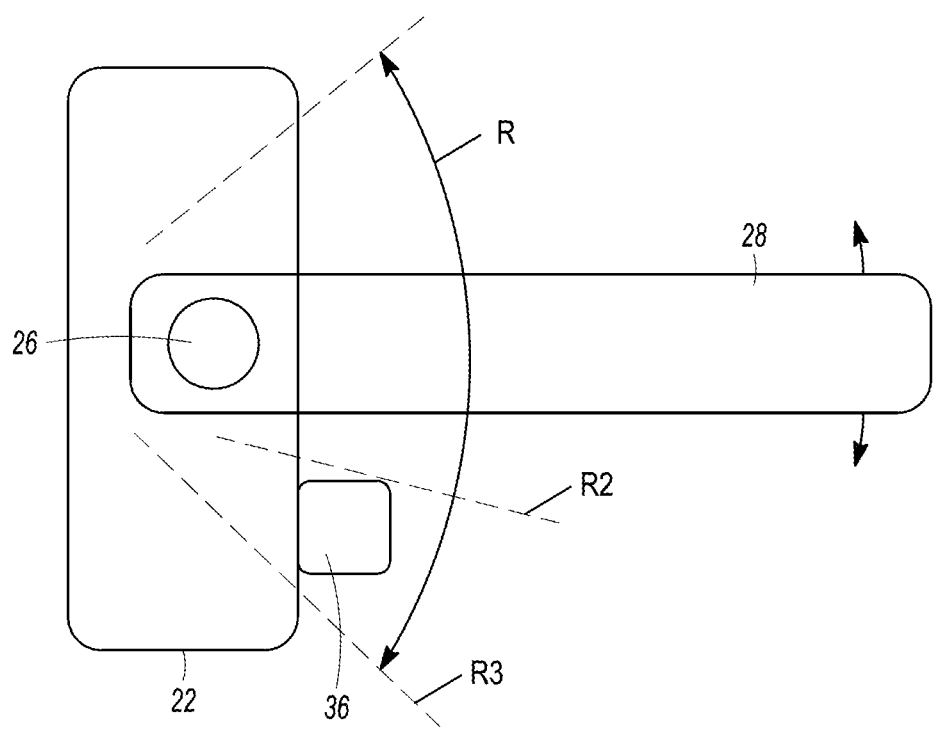
FIG. 2 is another side view of the embodiment of FIG. 1.

With reference to FIGS. 1 and 2, in one embodiment a system 20 includes a support assembly 22 that may be attached to a vehicle 24, a pivot connection 26 attached to the support assembly and that defines a range "R" of up and down (vertical) movement, and a third rail paddle assembly 28 having an arm unit 30 and a paddle 32. The paddle may include a generally flat body. In the illustrated embodiment, it is made of metal and is paddle shaped. The paddle assembly is attached to the pivot connection for the paddle to contact a third rail 34 and move up and down relative to the third rail when the support assembly is operably attached to the vehicle. One of the pivot connection, the paddle assembly, or the support assembly includes a stop element 36 (e.g., stop bolt) that limits the range of the up and down movement ("R2") and prevents the paddle assembly from moving downwards to a bottom ("R3") of the range of movement. Thereby, upon encountering variances in third rail spacing, the stop element may ensure the paddle is not likely to, or never, travels below the third rail.

In another embodiment, the pivot connection further includes a flexible torsion element 38. The arm unit of the paddle assembly is attached to the torsion element for up and down movement of the paddle assembly. The torsion element may torsionally flex for the paddle assembly to move laterally upon application of a side force "F" to the paddle assembly and to spring back to a center position when the force is removed. For example, the torsion element could include a relatively hard polymer shaft, or a relatively stiff, elongate, helical extension spring, about which the paddle assembly vertically pivots, but which includes a degree of flexibility or bendiness for allowing some lateral motion of the paddle assembly.

Figure 3:
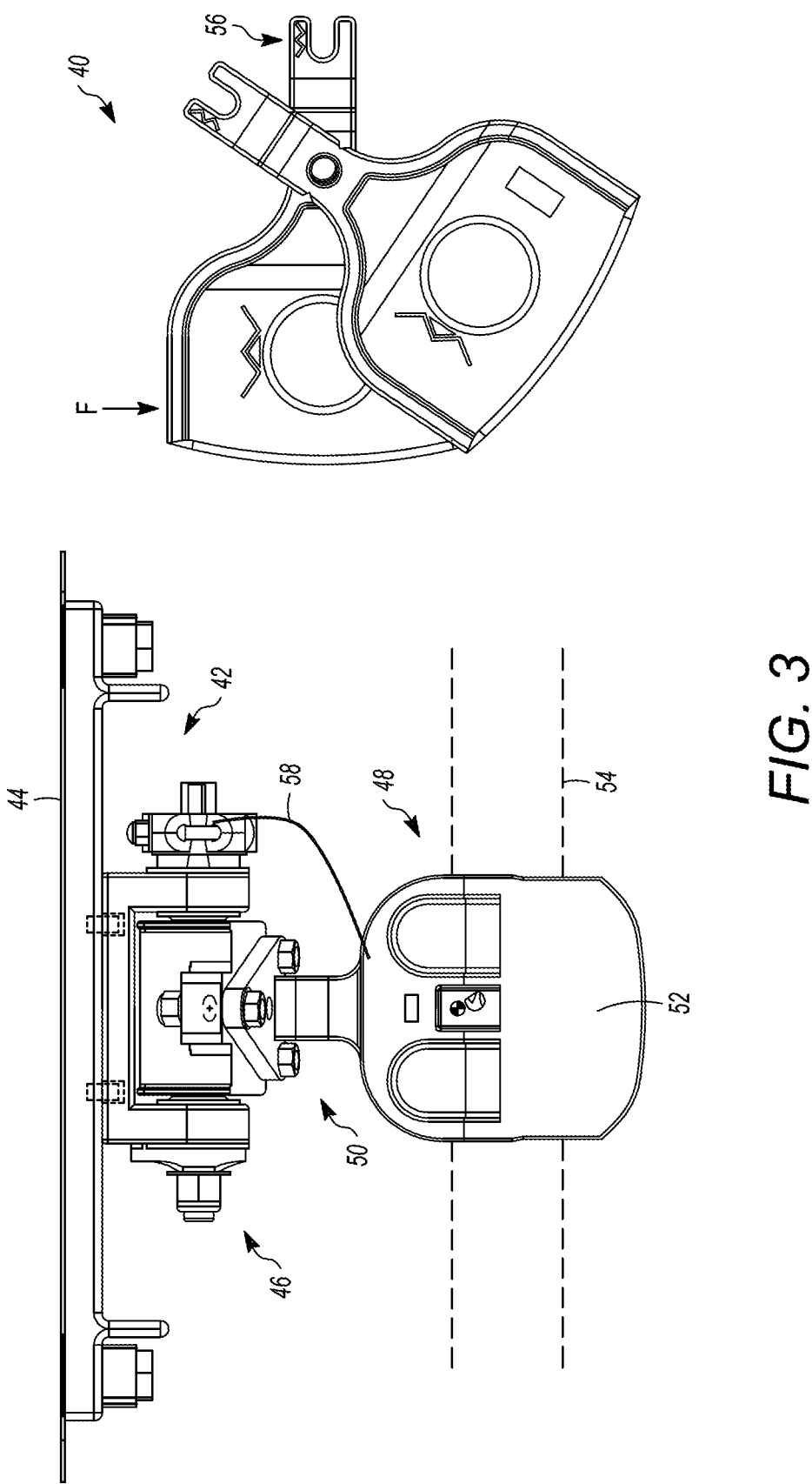
FIG. 3 is a schematic view of another embodiment of a third rail paddle system.

In another embodiment, with reference to FIG. 3, a system 40 includes a support assembly 42 configured for attachment to a vehicle 44, a pivot connection 46 attached to the support assembly, and a third rail paddle assembly 48 having an arm unit 50 and a paddle 52 attached to a first end of the arm unit. A second end of the arm unit is attached to the pivot connection for the paddle assembly to pivot relative to the support assembly and the paddle to contact a third rail 54 and move up and down relative to the third rail when the support assembly is attached to the vehicle. The paddle assembly includes a shear element 56 (e.g., shear bolt or shear pin) configured to shear upon application of a determined force "F" to a side of the paddle for one of the paddle to detach from the arm unit or the arm unit to the detach from the pivot connection. Thereby, according to one aspect, instead of a side force potentially causing the entire paddle assembly, pivot connection, and all or part of the support assembly to rip away from the vehicle, the shear element may instead facilitate just the paddle or paddle assembly breaking away, resulting in overall less damage to the vehicle.

The system of FIG. 3 may also include a tether 58 connecting the paddle or the arm unit (whichever detaches when the shear element shears) to either the pivot connection or the support assembly. Thereby, when the paddle breaks away from the arm unit, or the entire paddle assembly breaks away from the pivot connection, it does not drop onto the route surface (e.g., rail tracks) but is instead carried along by the vehicle on the tether.

Figure 4:
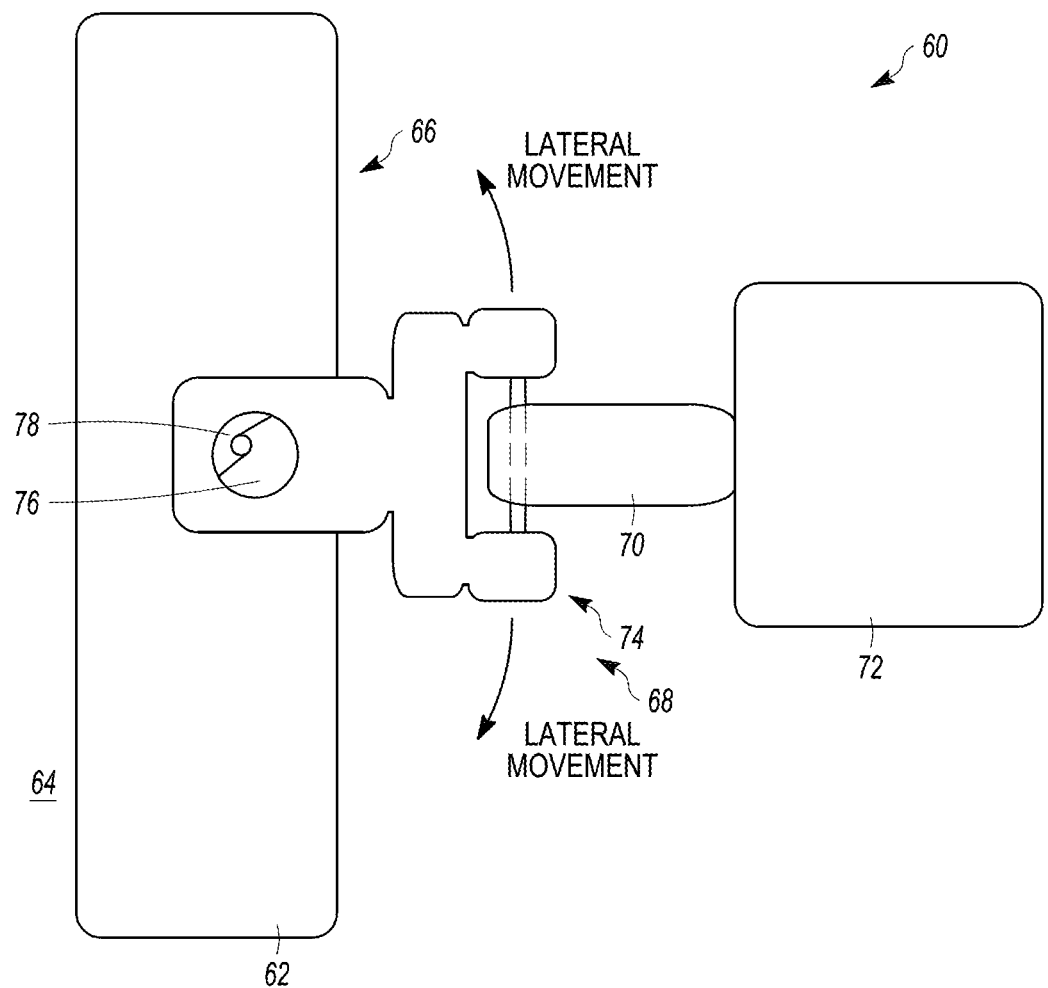
FIG. 4 is a schematic view of another embodiment of a third rail paddle system.

In another embodiment, with reference to FIG. 4 (which is a schematic side view), a system 60 includes a support assembly 62 configured for attachment to a vehicle 64, a pivot connection 66 attached to the support assembly, and a third rail paddle assembly 68 having an arm unit 70 and a paddle 72. The paddle assembly is attached to the pivot connection. The pivot connection includes a vertical pivot assembly 74 and a lateral pivot assembly 76 for the paddle assembly to pivot relative to the support assembly both laterally and vertically. (From the perspective of FIG. 4, the lateral pivoting is about the pivot 76, and vertical pivoting is of the arm unit and paddle about the shaft generally pointed to by element 74.) The lateral pivot assembly includes a biasing element, such as an elastic element 78 (e.g., spring) that biases the lateral pivot assembly and paddle assembly towards a center of a range of lateral pivoting of the paddle assembly. In operation, the paddle may be free to track along the third rail and move up and down due to the vertical pivot assembly. If a force is applied to the side of the paddle due to the paddle hitting debris or the third rail itself (e.g., due to variances in third rail spacing, such as encountering a junction where the spacing of a third rail transitions from one spacing to a different spacing), the paddle assembly is free to pivot laterally, and will then spring back once the force is absent.

Figure 5:
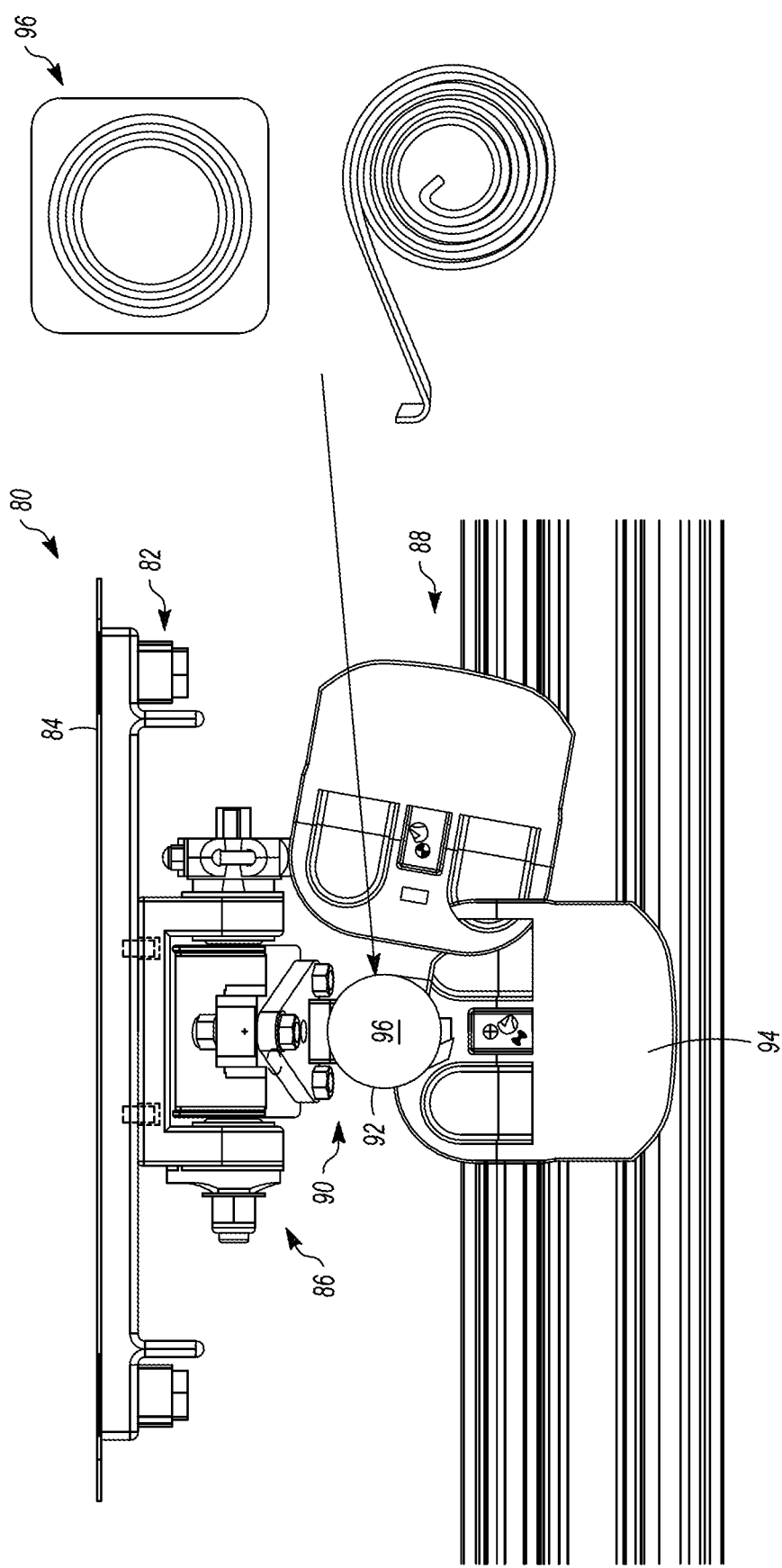
FIG. 5 is a schematic view of another embodiment of a third rail paddle system.

In another embodiment, with reference to FIG. 5, a system 80 includes a support assembly 82 that may attach to a vehicle 84, a pivot connection 86 attached to the support assembly, and a third rail paddle assembly 88 attached to the pivot connection for the paddle assembly to pivot vertically relative to the support assembly. The paddle assembly includes an arm 90 attached to the pivot connection, a lateral pivot joint 92 attached to the arm, and a paddle 94 attached to the lateral pivot joint. During operation, the paddle may move laterally relative to the arm about the lateral pivot joint. The pivot joint includes an elastic element 96 that biases the paddle to a center of a range of lateral movement of the paddle about the pivot joint. Operation may be similar to that of the system of FIG. 4, except the lateral pivot point lies in the paddle assembly instead of the pivot connection. Suitable elastic elements may include flexible rubber pieces, springs, composite materials and the like.

In either of the embodiments of FIG. 4 or FIG. 5, according to one aspect, the elastic element may be non-linear, such that the elastic element allows the lateral movement of the paddle only upon application of forces against a side of the paddle above a determined or designated degree of force. That is, the elastic element resists movement from application of forces below the determined degree of force, but if a force is applied greater than the determined or designated degree of force, the resistance of the elastic element is partially overcome, allowing lateral movement. When the force is removed, the elastic element causes the paddle to return to its center position.

In any of the embodiments herein, the paddle may be a scraper. A suitable scraper may be a plate having scraping blades. Suitable blades may be formed from metal, ceramic, or structural reinforced resin. In one embodiment, the scraper is an ice scraper. The ice scraper may include ice removal features attached to its underside that contacts the third rail. Other scrapers may include leaf scrapers, insect scrapers, and mud or debris scrapers. The scraper may include a brush, a deflector, and the like. In one embodiment, the scraper includes a feature to catch and extinguish sparks.

Additionally, the support assembly may include an electric isolator to electrically insulate the support assembly from the vehicle when the support assembly is attached to the vehicle. This may reduce or prevent electrical power from being transferred from the third rail to the vehicle. With regard to scrapers, at least the ice scrapers are generally not intended for power transfer, and that could result in vehicle damage.

In one embodiment, the vehicle could be a third rail maintenance vehicle, a hi-rail inspection vehicle, a switcher, or the like that does not receive traction power from the third rail at all but is instead powered by a battery bank and/or fuel engine.

In one example, a system includes a support assembly that may attach to a vehicle and a pivot connection attached to the support assembly. The pivot connection may define a range of movement. The system also includes a paddle assembly having an arm unit and a paddle. The paddle assembly may be attached to the pivot connection for the paddle to contact a surface and move relative to the third rail while the support assembly is attached to the vehicle. One of the pivot connection, the paddle assembly, or the support assembly may include a stop element that limits the range of the movement and prevents the paddle assembly from moving downwards to a bottom of the range of movement.

The paddle assembly may be a third rail paddle assembly that may contact a third rail and to conduct electric current from the third rail to the vehicle. The paddle assembly may be a scraper that may scrape ice off of a portion of a route traveled by the vehicle.

The pivot connection may include a flexible torsion element with the arm unit of the paddle assembly attached to the torsion element for movement of the paddle assembly. The torsion element may torsionally flex for the paddle assembly to move laterally upon application of a side force to the paddle assembly and to spring back to a center position responsive to removal of the force.

The paddle assembly may include a shear element that may shear upon application of a determined force to a side of the paddle for the paddle to detach from the arm unit. The paddle assembly may include a shear element that may shear upon application of a determined force to a side of the paddle for the arm unit to the detach from the pivot connection.

The pivot connection may include a vertical pivot assembly and a lateral pivot assembly for the paddle assembly to pivot relative to the support assembly both laterally and vertically. The lateral pivot assembly may include an elastic element that biases the lateral pivot assembly and paddle assembly toward a center of a range of lateral pivoting of the paddle assembly In one example, a system includes a support assembly that may attach to a vehicle, a pivot connection attached to the support assembly, and a third rail paddle assembly having an arm unit and a paddle attached to a first end of the arm unit. A second end of the arm unit may be attached to the pivot connection for the paddle assembly to pivot relative to the support assembly and the paddle to contact a third rail and move up and down relative to the third rail when the support assembly is attached to the vehicle.

The paddle assembly may include a shear element that may shear upon application of a determined force to a side of the paddle for one of the paddle to detach from the arm unit or the arm unit to the detach from the pivot connection. The system also may include a tether connecting the one of the paddle or the arm unit that detaches when the shear element shears to one of the pivot connection or the support assembly.

The pivot connection may define a range of up and down movement of the paddle assembly. One of the pivot connection, the paddle assembly, or the support assembly may include a stop element that limits the range of movement of the paddle assembly and prevents the paddle assembly from moving downwards to a bottom of the range of movement.

The paddle assembly may be a third rail paddle assembly that can contact a third rail and conduct electric current from the third rail to the vehicle. The paddle assembly may be an ice scraper that scrapes ice off of a third rail.

In one example, a system includes a support assembly that may attach to a vehicle, a pivot connection attached to the support assembly, and a third rail paddle assembly attached to the pivot connection for the paddle assembly to pivot vertically relative to the support assembly. The paddle assembly may include an arm attached to the pivot connection, a lateral pivot joint attached to the arm, and a paddle attached to the lateral pivot joint. The paddle may move laterally relative to the arm about the lateral pivot joint. The pivot joint may include an elastic element that biases the paddle to a center of a range of lateral movement of the paddle about the pivot joint.

The elastic element may be non-linear such that the elastic element allows the lateral movement of the paddle only upon application of forces against a side of the paddle above a determined degree of force. The paddle may include an ice scraper. The support assembly may include an electric isolator to electrically insulate the support assembly from the vehicle when the support assembly is attached to the vehicle.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. Aspects of the invention are described in the claims below.

What is claimed is:

1. A system, comprising:
a support assembly configured for attachment to a vehicle;
a pivot connection attached to the support assembly, the pivot connection defining a range of movement;
a paddle assembly having an arm unit and a paddle, the paddle attached to a first end of the arm unit and the paddle assembly attached to the pivot connection via a second end of the arm unit, a bottom side of the paddle configured to contact a top surface of a third rail and pivot in a vertical direction relative to the support assembly while the support assembly is attached to the vehicle and while the vehicle moves along a route,
the pivot connection comprising a flexible torsion element with the arm unit of the paddle assembly attached to the torsion element for movement of the paddle assembly, wherein the torsion element is configured to torsionally flex for the paddle assembly to move laterally upon application of a side force to the paddle assembly and to spring back to a center position responsive to removal of the force; and a stop element operably coupled with one of the pivot connection, the paddle assembly, or the support assembly, the stop element configured to limit the range of the movement and prevent the paddle assembly from moving downwards to a bottom of the range of movement.

2. The system of claim 1, wherein the paddle assembly is a third rail paddle assembly configured to contact the third rail and to conduct electric current from the third rail to the vehicle.

3. The system of claim 1, wherein the paddle assembly is an ice scraper configured to scrape ice off of a portion of the route traveled by the vehicle.

4. The system of claim 1, wherein the paddle assembly includes a shear element configured to shear upon application of a determined force to a side of the paddle for the paddle to detach from the arm unit.

5. The system of claim 1, wherein the paddle assembly includes a shear element configured to shear upon application of a determined force to a side of the paddle for the arm unit to detach from the pivot connection.

6. A system, comprising:
a support assembly configured for attachment to a vehicle;
a pivot connection attached to the support assembly, the pivot connection including a vertical pivot assembly and a lateral pivot assembly for a third rail paddle assembly to pivot relative to the support assembly both laterally and vertically; and
the third rail paddle assembly having an arm unit and a paddle attached to a first end of the arm unit, wherein a second end of the arm unit is attached to the pivot connection for the paddle assembly to pivot relative to the support assembly and the paddle to contact a top surface of a third rail and move up and down relative to the third rail when the support assembly is attached to the vehicle and while the vehicle moves along a route.

7. The system of claim 6, wherein the paddle assembly includes a shear element configured to shear upon application of a determined force to a side of the paddle for one of the paddle to detach from the arm unit or the arm unit to the detach from the pivot connection.

8. The system of claim 7, further comprising a tether connecting the one of the paddle or the arm unit that detaches when the shear element shears to one of the pivot connection or the support assembly.

9. The system of claim 6, wherein the pivot connection defines a range of up and down movement of the paddle assembly.

10. The system of claim 9, wherein one of the pivot connection, the paddle assembly, or the support assembly includes a stop element that limits the range of movement of the paddle assembly and prevents the paddle assembly from moving downwards to a bottom of the range of movement.

11. The system of claim 6, wherein the paddle assembly is a third rail paddle assembly configured to contact a third rail and to conduct electric current from the third rail to the vehicle.

12. The system of claim 6, wherein the paddle assembly is an ice scraper configured to scrape ice off of a third rail.

13. The system of claim 6, wherein the lateral pivot assembly includes an elastic element that biases the lateral pivot assembly and paddle assembly toward a center of a range of lateral pivoting of the paddle assembly.

14. A system, comprising:
a support assembly configured for attachment to a vehicle;
a pivot connection attached to the support assembly; and
a third rail paddle assembly attached to the pivot connection for the paddle assembly to pivot vertically relative to the support assembly, the third rail paddle assembly including a paddle and an arm, wherein the paddle is attached to a first end of the arm and the third rail paddle assembly is attached to the pivot connection via a second end of the arm, wherein the third rail paddle assembly is configured to move in a vertical direction relative to the pivot connection while the vehicle moves along a route,
wherein the paddle assembly comprises a lateral pivot joint attached to the arm, the paddle being attached to the lateral pivot joint, the lateral pivot joint including an elastic element, the paddle configured to move laterally relative to the arm about the lateral pivot joint, and wherein the elastic element included within the lateral pivot joint biases the paddle to a center of a range of lateral movement of the paddle about the pivot joint.

15. The system of claim 14, wherein the elastic element is non linear such that the elastic element allows the lateral movement of the paddle only upon application of forces against a side of the paddle above a determined degree of force.

16. The system of claim 14, wherein the paddle comprises an ice scraper.

17. The system of claim 16, wherein the support assembly includes an electric isolator to electrically insulate the support assembly from the vehicle when the support assembly is attached to the vehicle.

* * * * *